(12) United States Patent
Manicka

(10) Patent No.: US 11,854,020 B2
(45) Date of Patent: Dec. 26, 2023

(54) MULTI-DIMENSIONAL APPROACH TO ANTI-COUNTERFEITING ACROSS DIFFERENT INDUSTRIES

(71) Applicant: Manicka Institute LLC, Woodbury, MN (US)

(72) Inventor: Yatheendhar D. Manicka, Woodbury, MN (US)

(73) Assignee: Manicka Institute LLC, Woodbury, MN (US)

( * ) Notice: Subject to any disclaimer, the term of this patent is extended or adjusted under 35 U.S.C. 154(b) by 0 days.

(21) Appl. No.: 17/855,750

(22) Filed: Jun. 30, 2022

(65) Prior Publication Data

US 2022/0335445 A1 Oct. 20, 2022

Related U.S. Application Data

(63) Continuation of application No. 17/061,315, filed on Oct. 1, 2020, now abandoned.

(60) Provisional application No. 62/908,989, filed on Oct. 1, 2019.

(51) Int. Cl.
*G06Q 30/018* (2023.01)
*G06K 7/10* (2006.01)
*G06K 19/077* (2006.01)

(52) U.S. Cl.
CPC ..... *G06Q 30/0185* (2013.01); *G06K 7/10386* (2013.01); *G06K 19/0776* (2013.01)

(58) Field of Classification Search
None
See application file for complete search history.

(56) References Cited

U.S. PATENT DOCUMENTS

| | | | |
|---|---|---|---|
| 2005/0193112 A1 | 9/2005 | Smith et al. | |
| 2007/0069895 A1* | 3/2007 | Koh | G08B 13/2417 340/572.1 |
| 2009/0044012 A1* | 2/2009 | Bishop | G06Q 20/10 713/168 |

(Continued)

OTHER PUBLICATIONS

International Search Report and English Translation of Box V of the Written Opinion dated Jan. 8, 2021, received for corresponding PCT Application No. PCT/US20/53810.

*Primary Examiner* — Jan P Mincarelli
(74) *Attorney, Agent, or Firm* — Kinney & Lange, P.A.; John D. Leighton

(57) ABSTRACT

Application and associated methods relate to facilitating verification of authenticity of a product instance. Such verification of authenticity is facilitated by a verification transceiver configured to be affixed to a product instance. The verification transceiver includes an engagement fixture configured to affix the verification transceiver to a product instance. The verification transceiver includes a receiver configured to receive a query signal from a proximate mobile device. The verification transceiver includes a transmitter configured to transmit a current encoded signal indicative of the product instance in response to receiving the query signal. The verification transceiver also includes a verification-code sequencer configured to advance the current encoded signal to a next encoded signal in a sequence of encoded signals, each of the sequence indicative of the product instance, current encoded signal advanced to be transmitted in response to a next received query signal.

26 Claims, 11 Drawing Sheets

(56) References Cited

U.S. PATENT DOCUMENTS

| | | |
|---|---|---|
| 2014/0317005 A1 | 10/2014 | Balwani |
| 2015/0134552 A1* | 5/2015 | Engels .................. G06Q 10/087 |
| | | 705/318 |
| 2016/0267493 A1 | 9/2016 | Liu |
| 2019/0114584 A1 | 4/2019 | Toohey et al. |
| 2019/0253254 A1 | 8/2019 | Brownlee et al. |

* cited by examiner

MULTI-DIMENSIONAL APPROACH TO ANTI-COUNTERFEITING ACROSS DIFFERENT INDUSTRIES

CROSS-REFERENCE TO RELATED APPLICATION(S)

This application is a continuation of U.S. application Ser. No. 17/061,315, filed Oct. 1, 2020, which in turn claims priority to U.S. Provisional Application No. 62/908,989, entitled "Multi-Dimensional Approach to Anti-Counterfeiting across Different Industries" by Yatheendhar D. Manicka, filed Oct. 1, 2019. Each of the specifications of the above referenced applications is incorporated in its entirety herein by reference.

BACKGROUND

Counterfeiting has become a common phenomenon wherein sub-standard products resembling the genuine products in look, feel, and labelling are sold at a much cheaper price, without the original manufacturer's permission. This had led to serious revenue loss for the actual brand owner, loss of trust by end customer, impact on health in case of consumable goods, etc. Although methods do exist to counter this issue, a majority of these methods don't play a vital role throughout the supply chain, as these methods are more or less uni-dimensional (i.e., the key focus is on one of the following aspects—secure labels, holograms, tamper proof packaging, etc.). This can lead to more overhead and additional effort in the existing process and is thereby an unsustainable solution in the long run.

SUMMARY

Application and associated methods relate to a method for facilitating verification of authenticity of a product instance. The method includes receiving, by a verification transceiver affixed to the product instance, a query signal from a proximate mobile device. The method includes transmitting, by the verification transceiver, a current encoded signal indicative of the product instance in response to receiving the query signal. The method also includes advancing, by the verification transceiver, the current encoded signal to a next encoded signal in a sequence of encoded signals, each indicative of the product instance, the current encoded signal advanced to be transmitted in response to a next received query signal.

Some embodiments relate to a verification transceiver for facilitating verification of authenticity of a product instance. The verification transceiver includes an engagement fixture configured to affix the verification transceiver to a product instance. The verification transceiver includes a receiver configured to receive a query signal from a proximate mobile device. The verification transceiver includes a transmitter configured to transmit a current encoded signal indicative of the product instance in response to receiving the query signal. The verification transceiver also includes a verification-code sequencer configured to advance the current encoded signal to a next encoded signal in a sequence of encoded signals, each of the sequence indicative of the product instance, current encoded signal advanced to be transmitted in response to a next received query signal.

Some embodiments relate to a method for facilitating verification of authenticity of a product instance. The method includes transmitting, by a mobile device, a query signal to a proximate product instance. The method includes receiving, by the mobile device, a current encoded signal indicative of the product instance from the proximate product instance. The current encoded signal being a current one of a sequence of encoded signals. The current encoded signal is sent by the proximate product instance in response to the proximate product instance receiving the query signal. The method includes transmitting, by the mobile device, an authentication request signal to a product-authentication internet website in response to receiving the current encoded signal. The authentication request signal includes the current encoded signal. The method includes receiving, by the mobile device, a verification signal indicative of authenticity of the product instance from the product-authentication website. The method also includes indicating the authenticity of the product as indicated by the verification signal.

Some embodiments relate to a mobile device system for facilitating verification of authenticity of a product instance. the mobile device system including a first transmitter configured to transmit a query signal to a proximate product instance. The mobile device system including a first receiver configured to receive a current encoded signal indicative of the product instance from the proximate product instance. The current encoded signal is a current one of a sequence of encoded signals. The current encoded signal is sent by the proximate product instance in response to the proximate product instance receiving the query signal. The mobile device system includes a second transmitter configured to transmit an authentication request signal to a product-authentication internet website. The authentication request signal includes the current encoded signal. The mobile device system includes a second receiver configured to receive a verification signal indicative of authenticity of the product instance from the product-authentication website. The mobile device system also includes a user interface configured to indicate, to a user of the mobile device, the authenticity of the product as indicated by the verification signal.

DETAILED DESCRIPTION

Apparatus and associated methods relate to using combinations of Internet of Things (IoT) technologies, blockchain secured data, time fencing, and location fencing to provide various services related to consumer and/or industrial products. Such services can include, for example, supply-chain management, product authentication, management of customer-loyalty programs, etc. Such apparatus and methods adopt Internet of Things (IoT) technologies for creation of a digital entity for each physical instance or product instance that is produced or manufactured. The digital entity is formed as a product-instance record that includes one or more product-instance entries. Each product-instance entry can correspond to a specific product-instance event, for example. Such product-instance events can include, for example, initial manufacture of the product instance, shipment of the product instance, transfer of the product instance to a warehouse or retailer, customer verification of authenticity of the product instance, etc. Each product-instance record is formed as a block chain—a sequential ledger that is resistant to post-creation modifications or alterations. These digital entities (i.e., product-instance records) can include various data that relates to the corresponding actual product instance, such as, for example, the date, time, location, and/or other metrics related to the actual product instance's manufacture, distribution, and/or sale, etc. Integrity of these digital entities is provided by linking each entry (i.e., product-instance entry) of the sequential ledger to its immediate predecessor (i.e., the preceding product-instance entry), by creating a cryptographic hash, based on the entry and its linked predecessor(s), by providing time-fencing limitations—requiring ledger entries to be created within a predetermined time frame—and/or by providing geo-fencing limitations—requiring ledger entries to be created from within a geographical boundary—to ledger entries, etc.

Figure 1:
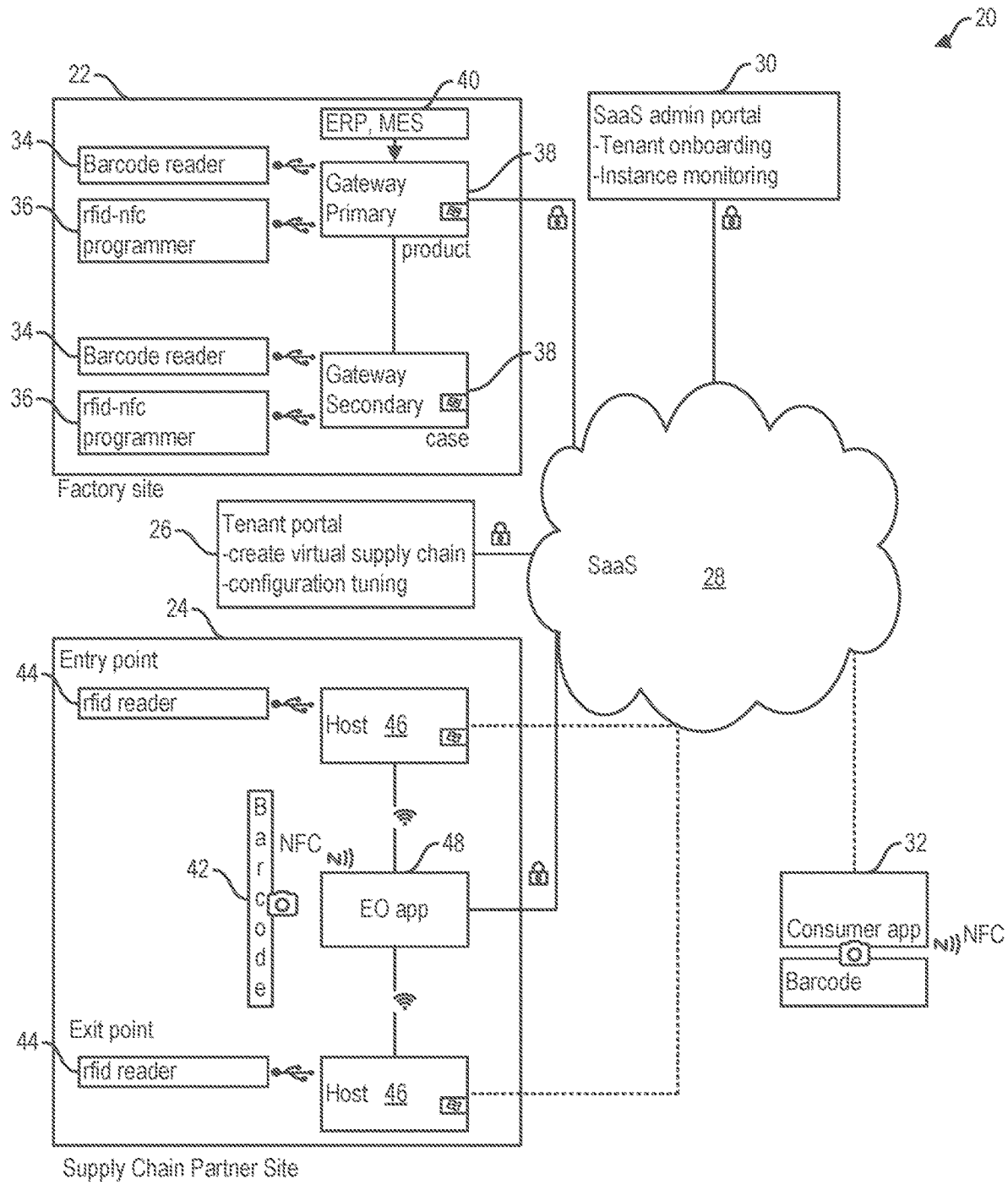
FIG. 1 is a block diagram of an embodiment of a system architecture for a multi-dimensional approach to anti-counterfeiting across different industries.

FIG. 1 is a block diagram of a system for providing these various services related to consumer products, which can be produced and/or used by various different industries. In FIG. 1, product services system 20 includes factory-site product-data system 22, partner-site product-data system 24, tenant product-data portal 26, internet cloud 28, product-data management server 30, and mobile app 32. Each of factory-site product data system 22, partner-site product data system 24, and tenant product data portal 26 can add product data related to manufacture and supply-chain of a product to a product database stored on internet cloud 28. The product database stored on internet cloud 28 is managed by product-data management server 30. Mobile app 32 can be located on mobile devices, such as a mobile phone. These components of product services system 20 can be configured to perform various services related to a consumer product as will be described below. For example, mobile app 32 can be configured to receive an encoded signal indicative of a product instance. The encoded signal can be transmitted by a verification transceiver affixed to the product instance. The mobile app 32 can then determine authenticity of and/or display other product data related to the product instance by which the encoded signal was transmitted, as will be described below.

Factory-site product-data system 22 includes barcode readers 34, RFID-NFC programmers/readers 36, IoT (Internet of Things) gateways 38 and ERP-MES (Enterprise Requirements Planning-Manufacturing Execution System) 40. Factory-site product data system 22 can be configured to create and/or initialize a digital entity for each product instance that is produced or is planned to be produced. Such a digital entity can be associated with a specific verification transceiver that is or will be affixed to the product instance. Various types of verification transceivers can be affixed to a product instance. For example, a verification transceiver can include a barcode label, and/or an RFID chip. At various stages of a manufacturing process, the barcode label and/or the RFID chip can be read by a corresponding one of barcode readers 34 and/or RFID-NFC programmers/readers 36, respectively. All data collected by factory-site product data system 22 pertaining to each product instance can be uploaded to a product database stored on internet cloud 28. ERP-MES 40 can be configured to coordinate the manufacture and/or production of product instances of a product with product-instance data collection and storage of such data in a product database.

Partner-site product data system 24 includes barcode readers 42, RFID-NFC readers 44, host computers 46 and EO app (Economic Operator app) 48. Partner-site product data system 24 can be configured to add one or more product-instance entries to a digital entity for each product-instance event that happens at a location corresponding to partner-site product data system 24. EO app 48 can be, for example, a supply-chain node application configured to record supply-chain events for product instances that occur at the corresponding partner site. Partner sites can include sites that provide services that facilitates manufacture, distribution, and/or sales of the product instances manufactured at the factory corresponding to factory-site product data system 22. Partner-site product data system 22 can be configured to create additional product-instance entries corresponding to the specific services provided at the partner site associated with partner-site product data system 22. Partner-site product data system 24 can, for example, associate product events with each product instance using barcode readers 42, and/or RFID-NFC readers 44. All data collected by partner-site product data system 24 pertaining to each product instance can be uploaded to the product database stored on internet cloud 28, via host computers 46 and/or EO app 48.

Tenant product-data portal 26 can be a server and/or host computer configured to interface with the product database stored on internet cloud 28. Tenant product-data portal 26 can be configured, for example, to configure or tune the product database associated with the product instances represented therein. In some embodiments, tenant product-data portal 26 can be configured to create a database structure corresponding to the manufacture and supply-chain associated with the product instances corresponding to the digital entries of the product database.

Product-data management server 30 is configured to manage the product database stored on internet cloud 28 as well as communicate with all systems that either produce product-instance entries or seek data regarding product-instance records. Product-data management server 30 can be configured to host a product-authentication internet website that facilitates verification of authenticity of product instances. For example, the product-authentication internet website might receive an authentication request signal from a product verification app running on a mobile device operated by a potential consumer of a product instance. The authentication request signal can include a current encoded signal indicative of the product instance from the product instance proximate the mobile device of the user. Product-data management server 30 might then retrieve a current expected signal indicative of the product instance. Product-data management server 30 might compare the current encoded signal with the current expected signal and generate a verification signal based on such a comparison.

Product services system 20 can be configured to provide various services related to consumer products. For example, product services system 20 can be configured to verify authenticity of product instances. In one embodiment, for example, product instances can equipped with verification transceivers for facilitating verification of authenticity of the product instance. The verification transceiver can include an engagement fixture, a receiver, a transmitter, and a verification-code sequencer. The engagement fixture can be configured to affix the verification transceiver to the product instance. For example, the engagement fixture can be, for example, an adhesive that adhesively affixes the verification transceiver to the product instance. The receiver of the verification transceiver can be configured to receive a query signal from a proximate mobile device. For example, a mobile device of a potential consumer can be configured with a product instance verification app. The mobile device can then be configured to send a query to the verification transceiver of the product instance in response to the user pushing a button and/or placing the mobile device proximate the product instance, for example. The transmitter of the verification transceiver can be configured to transmit, to the proximate mobile device, a current encoded signal indicative of the product instance in response to receiving the query signal. In some embodiments the receiver and transmitter of the verification transceiver are included within an RFID chip.

This current encoded signal can then be compared with an expected encoded signal provided by a product-instance record associated with the product instance. The product-instance record can be maintained on the internet cloud by a product-data management server. Such a product-data management server can host a product-authentication internet website for such a purpose. In some embodiments, an authentication request signal that includes the current encoded signal is transmitted, by the mobile device, to the product-authentication internet website in response to receiving the current encoded signal. The product-authentication internet website can then retrieve the expected encoded signal and compare the expected encoded signal with the current encoded signal. The product-authentication website can then transmit, to the mobile device, a verification signal indicative of authenticity of the product instance based upon the comparison of the expected encoded signal with the current encoded signal.

In another embodiment, the transmitter of the verification transceiver can be configured to transmit, to the proximate mobile device, an unencoded signal (e.g., a serial number) and a current encoded signal in response to receiving the query signal. Both unencoded signal and the current encoded signal are indicative of the product instance. An authentication request signal that includes the unencoded signal then can be transmitted, by the mobile device, to the product-authentication internet website in response to receiving the unencoded signal. The product-authentication internet website can then retrieve the expected encoded signal and transmit it to the mobile device for comparison with the current encoded signal. The mobile device can indicate, via a user interface, verification of authenticity of the product instance based upon the comparison of the expected encoded signal with the current encoded signal.

Each time a query signal is sent by a proximate mobile device to a particular product instance, the product instance sends a current encoded signal indicative of the product instance. The current encoded signal advances each time that particular product is queried. The verification-code sequencer of the verification transceiver can be configured to advance the current encoded signal to a next encoded signal in a sequence of encoded signals, each of the sequence indicative of the product instance, current encoded signal advanced to be transmitted in response to a next received query signal. The current encoded signal is thus only valid one time, as the next time that particular product instance is queried a new current encoded signal as advanced is indicative of the product instance. Such advancement prevents a hacker from reading a current encoded signal and then creating forged verification transmitters configured to provide the current encoded signal read from an actual device. This advancement is replicated by the product-authentication internet website such that the next time the product-authentication internet website is requested to authenticate that particular product instance, the current expected signal will be advanced in the same secret fashion as the current encoded signal is advanced.

The current encoded signal can be encoded according to an encoding algorithm that is replicated by a product-data management server such that verification of authenticity can be performed by comparing the current encoded signal with a current expected signal retrieved by the product-data management server. Advancing, by the verification transceiver, the current encoded signal to a next encoded signal can be performed in various manners. For example, in some embodiments, the current encoded signal can be advanced to a next encoded signal in a predetermined sequence of encoded signals. In some embodiments, the advancing the current encoded signal can be done according to a hashing algorithm. Advancing can be done either immediately before transmitting, by the verification transceiver, the current encoded signal indicative of the product instance in response to receiving the query signal, or thereafter.

In some embodiments, the number of queries of a verification transceiver can be limited in various manners. For example, the verification transceiver can transmit an index indicative of the number of times the verification transceiver has received a query signal from a proximate mobile device. The mobile device can then compare the index received with a predetermined limit. If the index received exceeds the predetermined limit, the mobile device can indicate such a condition to the user via a user interface. In another embodiment, the product instance database can maintain in index indicative of the number of times the product-authentication internet website had received authentication request signals from mobile devices. The product-authentication internet website can then compare the index with a predetermined limit and send a signal to the mobile device indicative of that comparison. In some embodiments, the sequence of encoded signals can be limited, such that after a verification transceiver has received a predetermined number of query signals, the verification transceiver responds with a signal indicative of too many queries received.

In some embodiments time fencing and/or location fencing (i.e., geo-fencing) can be used to verify authenticity of product instances. For example, the mobile device can send location data along with the current encoded signal indicative of the product instance to the product-authentication internet website. The product-authentication internet website can then compare the location data with an expected location for the product instance. Such an expected location can be retrieved from the product-instance record, for example. In some embodiment, in which product expiration concerns are present, time fencing can be used. For example, the mobile device can send date/time data along with the current encoded signal indicative of the product instance to the product-authentication internet website. The product-authentication internet website can then compare the date/time data with an expiration date for the product instance.

Such an expiration date can be retrieved from the product-instance record, for example, based on a date of manufacture.

Figure 2:
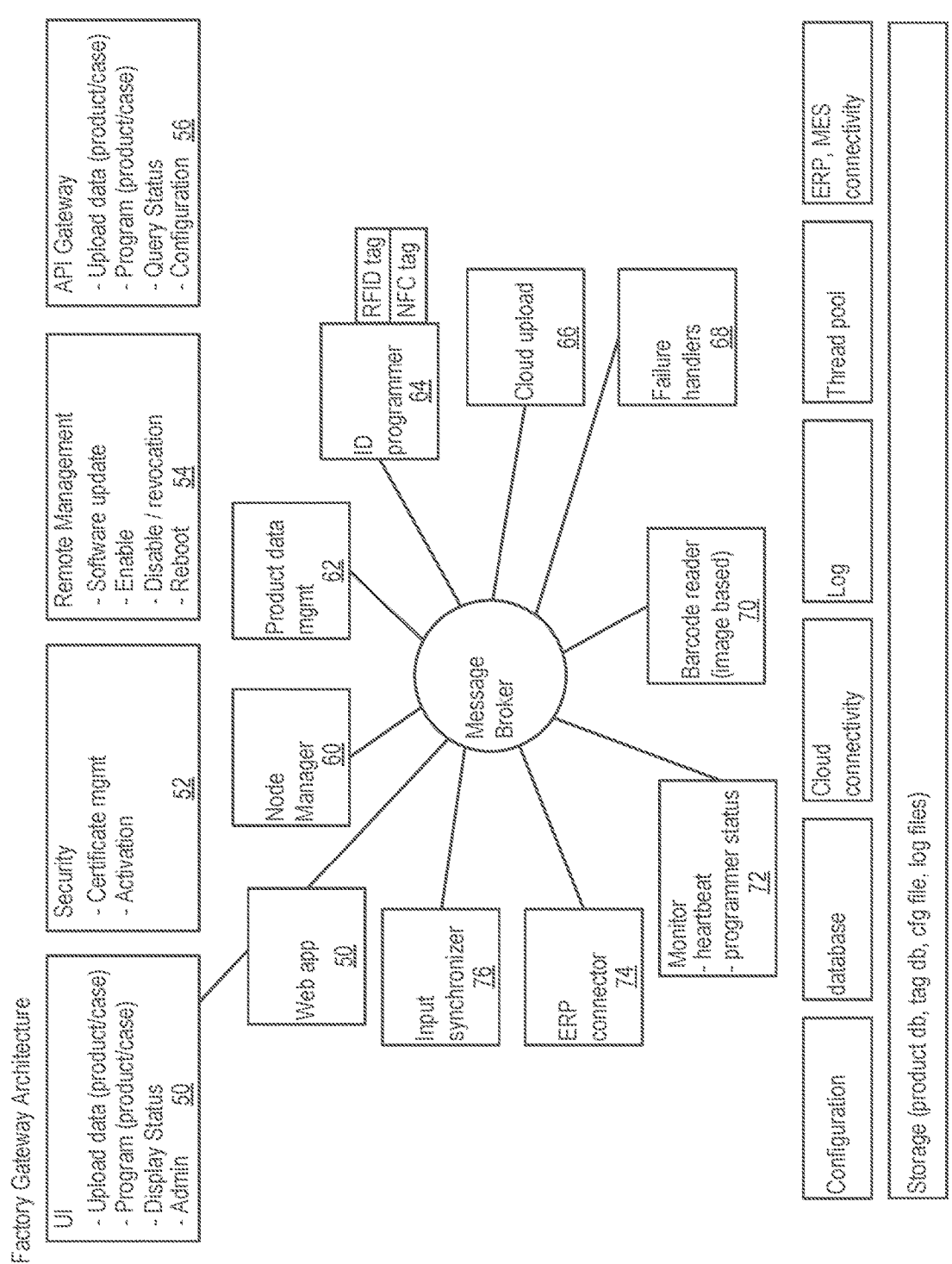
FIG. 2 is block diagram of an embodiment of a factory-site product-data system.

FIG. 2 is block diagram of an embodiment of a factory-site product-data system. In FIG. 2, factory-site product-data system 22 includes user interface 50, security module 52, remote management module 54, API (Application Program Interface) gateway 56, web app module 58, node manager module 60, product data management module 62, physical ID programmer 64, cloud upload manager 66, failure handlers 68, barcode reader 70, monitor program 72, ERP (Enterprise Resource Planning) connector 74, and input synchronizer 76. These various hardware and software components are configured to create a digital entity for each physical instance of a product produced, and to provide product-instance entries corresponding to various product-instance data obtained during the manufacturing of the product instances.

Factory-site product-data system 22 operates at factory sites where product instances of one or more physical products are produced. ERP connector 74 fetches product information from various factory ERP systems through ERP APIs. Monitor program 72 monitors the process threads and keep different threads synchronized with one another. Barcode reader 70 can be configured to read any barcode information on the product instances at various steps during the manufacturing thereof. Physical ID programmer 64 can be configured to program RFID/NFC tags that are or will be affixed to the product instances. Cloud upload manger 66 can be configured to upload all the product information to the enterprise system SaaS (Software as a Service) cloud. Product data management module 62 can be configured to manage various product data templates and to enable an operator(s) to create/edit/delete these various product data templates. Node manager module 60 can be configured to handle functions, such as, for example, activation, security management, SW (SoftWare) updates, reboots, etc. Web app module 58 can be configured to interact with the operator(s) of the system. Using web app module 58, the operator(s) can upload product information. Web app module 58 can be configured to display various product statistics. Web app module 58 can be further configured to operate as an administration console to authorize users.

Figure 3:
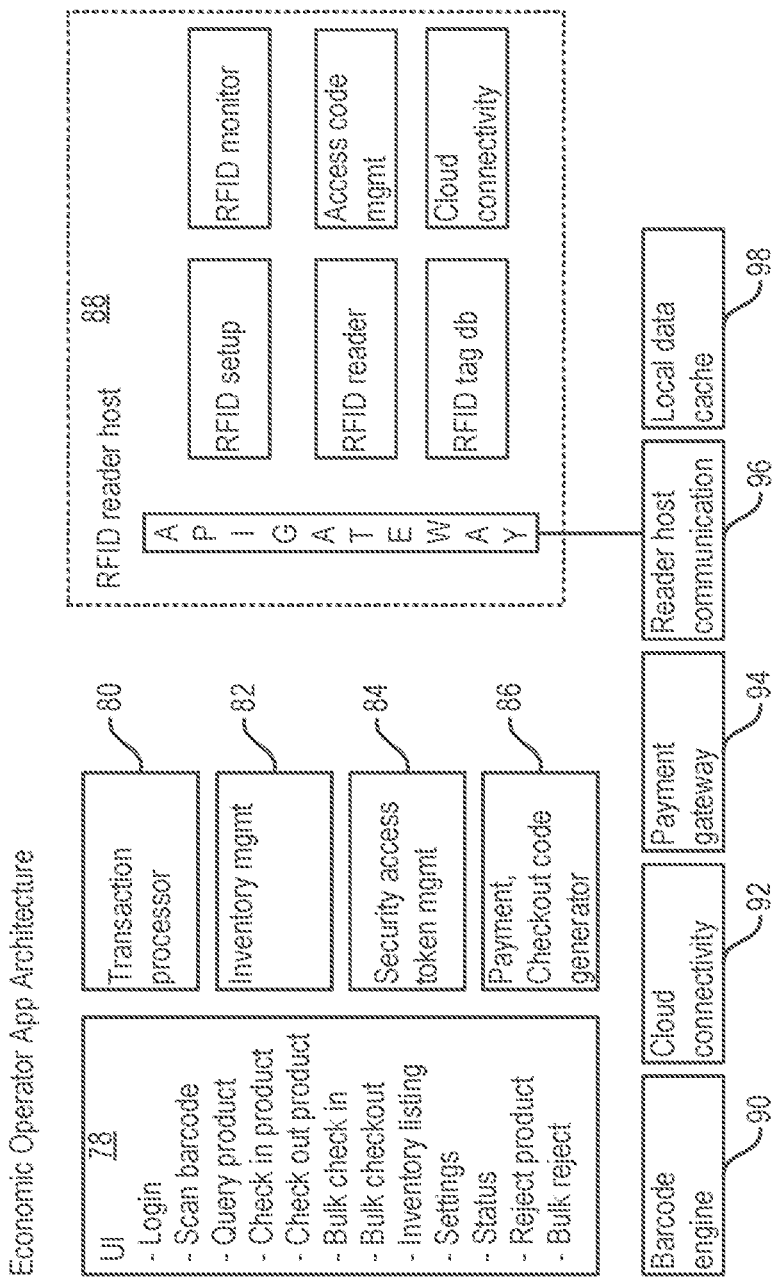
FIG. 3 is a block diagram of an embodiment of an economic operator app architecture.

FIG. 3 is a block diagram of an embodiment of an economic operator app architecture. In FIG. 3, economic operator app 48 includes web user interface 78, transaction processor 80, inventory management module 82, security access token management 84, payment/checkout code generator 86, RFID reader host 88, barcode engine 90, cloud connectivity manager 92, payment gateway 94, reader host communication module 96, and local data cache 98. Economic operator app 48 is configured to manage data collection of product-instance events and to upload such data to the product database.

Economic operator app 48 can be installed at each supply-chain node such as distributor warehouse, wholesale warehouses and end retailer shops. Economic operator app 48 has different components for performing the various tasks that pertain to data collection and management of product-instance events. RFID reader host 88 can be configured to memorialize check-in/check-out of product-instance events, such as, for example, reception of and shipment of a product instance. RFID reader host 88 can be used to scan each product instance at each product-instance event and to associate such product instances with the corresponding product-instance event. This product-instance event data can then be uploaded to the product database, via the API gateway. RFID reader host 88 can be configured to manage the RFID scanning, access code management, RFID tag database management etc. Web user interface 78 can be configured as a user interface of economic operator app 48. Web user interface 78 can be configured to facilitate various functionalities, such as, for example, login, query product, barcode scanning, accept/reject product, dash boarding, check in/check out of product, bulk reading etc.

Figure 4:
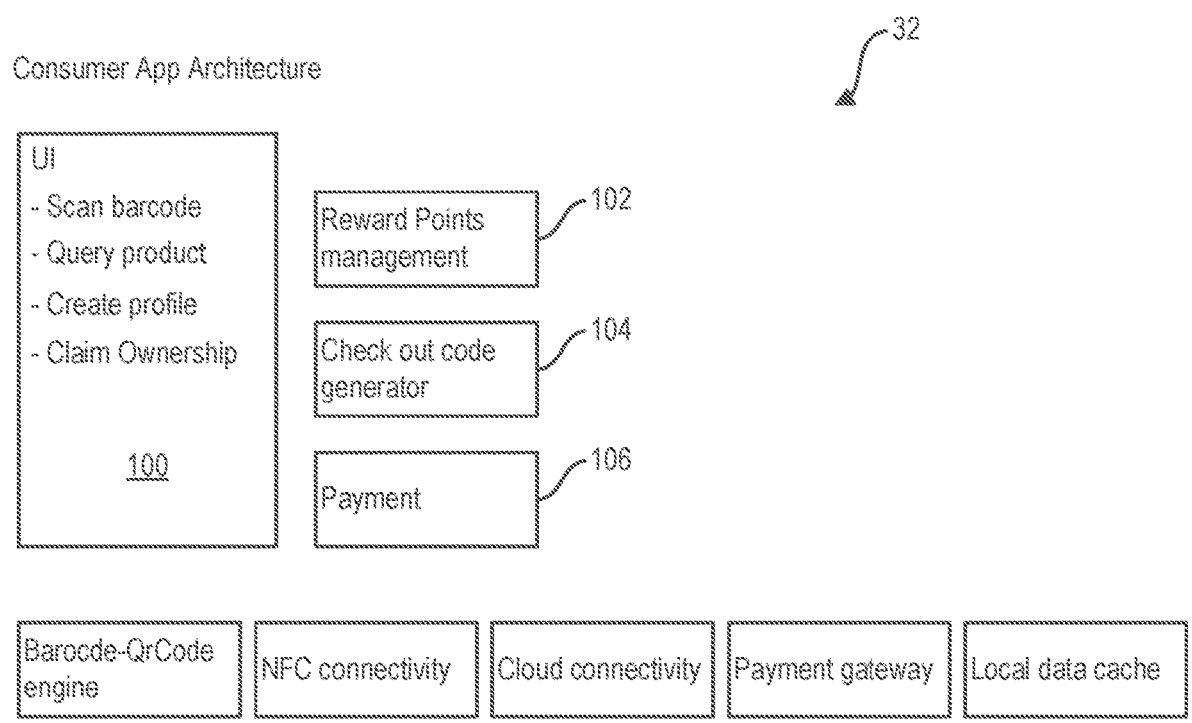
FIG. 4 is a block diagram of an embodiment of a mobile app architecture.

FIG. 4 is a block diagram of an embodiment of a mobile app architecture. In FIG. 4, mobile app 32 includes user interface 100, reward-points management module 102, checkout-code generator 104, and payment manager 106. Mobile app 32 is configured to provide services pertinent to a consumer of a product. For example, mobile app 32 can facilitate authentication of a product instance, facilitate purchase of a product instance, update customer loyalty data, etc.

Mobile app 32 is a smartphone application built for mobile and smart phone platforms including (but not limited to) Android and iOS based mobile phones. The user can install the app from either app distribution service such as Google Playstore or Apple Appstore. The user interface has provisions for login, scan barcode, scan NFC, query about the product for authenticity, create profile and claim ownership of reward points. The main modules of the app are barcode-QR code engine, NFC reader, Cloud connection manager, payment gateway, local data cache and reward point manager.

Figure 5:
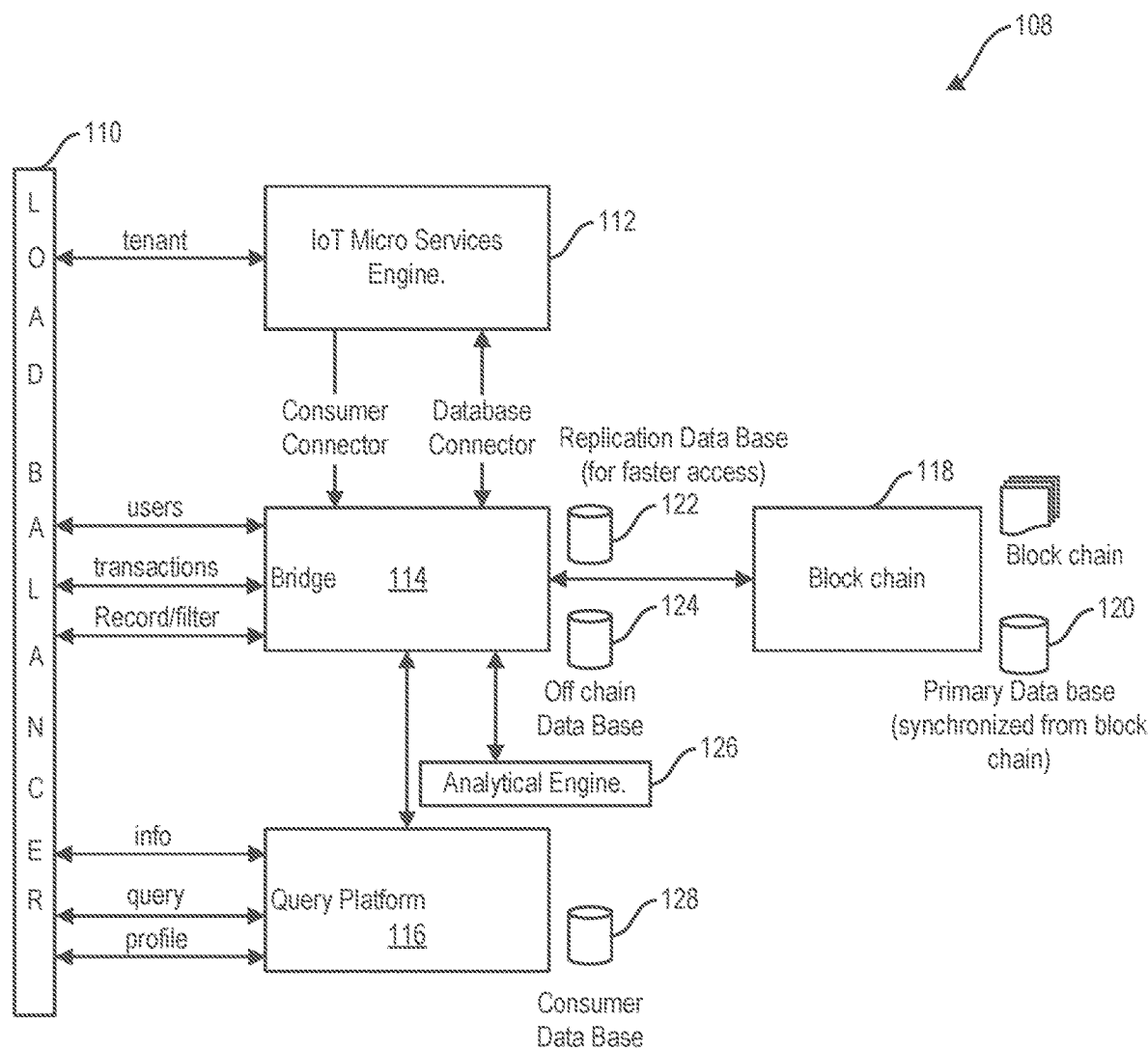
FIG. 5 is a block diagram of an embodiment of a SaaS (Software as a Service) bridge that functions as a web-based interface to a product database.

FIG. 5 is a block diagram of an embodiment of a SaaS (Software as a Service) bridge that functions as a web-based interface to a product database. SaaS bridge 108 includes load balancer 110, IoT (Internet of Things) micro services engine 112, bridge 114, query platform 116, blockchain database engine 118, primary database 120, replication 122 of primary database 120, off-chain database 124, analytical engine 126, and consumer database 128. SaaS bridge 108 is configured to manage the cloud-based product database as well as communications between such a database and authorized entities, such as, for example, factory-site product-data system 22, partner-site product-data system 24, tenant product-data portal 26, product-data management server 30, and mobile app 32 (as depicted in FIG. 1).

SaaS bridge 108 can be configured as a cloud-based application hosted in an access restricted public cloud. IoT Micro services engine 112 can be configured as an industrial-strength application enablement platform for supporting and executing Internet of Things (IoT) transactions pertaining to product instances of a product. IoT Micro services engine 112 can provide a multi-tenant micro service infrastructure that includes the key features required to build and deploy IoT applications. The product information pertaining to a product instance identified by a RFID/NFC, QR code, or barcode can be processed with the help of the IoT micro services engine 112.

Bridge 113 can be configured as an intermediary information exchange mechanism between IoT micro services engine 112, query platform 116, and blockchain database engine 118. Bridge 114 can provide processed information for dash-boarding functions of factory IoT gateway 38 and economic operator application 48, depicted in FIG. 1. Bridge 114 can maintain off-chain database 124 as well as replication 122 of primary database 120 of faster data access (e.g., by not having previously decoded database information, etc.).

Analytical engine 126 can be a multi-platform analytics and interactive visualization web application. Analytical engine 126 can provide charts, graphs, and alerts, etc. for the various authorized entities. Query platform 116 can be configured to handle entity requests for product authentication. Query platform 116 can supply authenticity of the product instance based on the block chain database and an encode signal indicative of a product instance as provided by a verification transceiver affixed to a product instance. Query platform 116 can also maintain a database for consumers for easy access of data.

Block chain database engine 118 can be configured to provide security to the product database. Blockchain technology can account for the issues of security and trust in several ways. First, new blocks (i.e., product-instance entries) are stored sequentially and chronologically. After a block has been added to the end of the blockchain, it is very difficult to subsequently alter the contents of the block, because each block contains its own hash, along with the hash of the block before it. If a hacker attempts to edit a transaction, as soon as any information in the block is changed, the block's hash will need to be changed or such a hash will not match the information in the block. The subsequent block in the chain will still contain the old hash, and the hacker would need to update the subsequent block as well in order to maintain consistency of hashes and information. Changing the hash pointing to a previous block, however, would require change that subsequent block's hash. Such a hacked change would require changes to ripple throughout the entire product-instance record (i.e., the blockchain) in this fashion. In order to change a single block, then, a hacker would need to change every single block after it on the blockchain. Recalculating all these hashes would take an enormous and improbable amount of computing power. In other words, once a block is added to the blockchain it becomes very difficult to edit and impossible to delete.

Primary database 120 can be configured as a main database of product services system 20 (depicted in FIG. 1). Primary database 120 can be synchronized with the information in the block chain.

Figure 6:
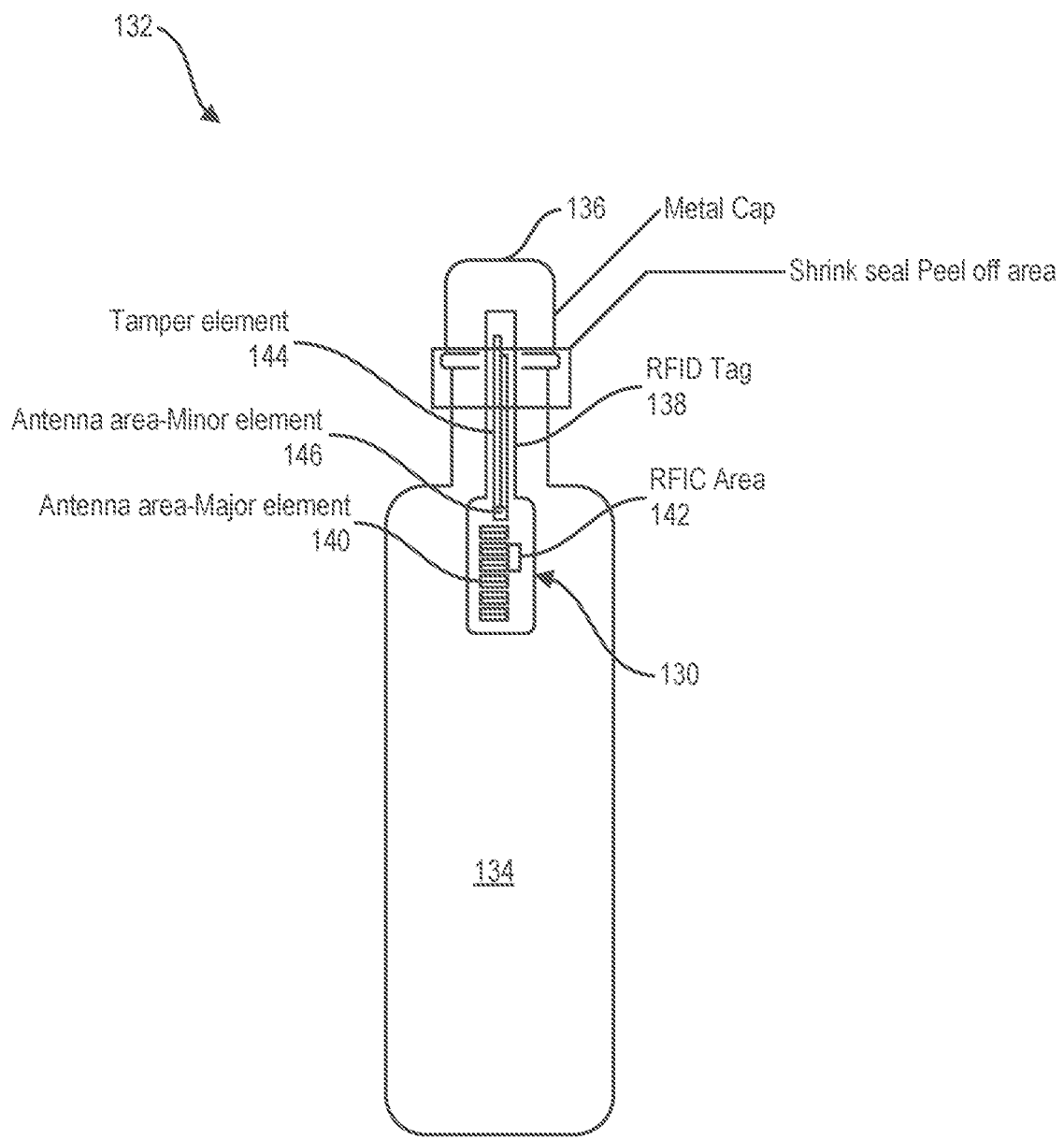
FIG. 6 is a schematic diagram of an embodiment of a verification transceiver.

FIG. 6 is a schematic diagram of an embodiment of a verification transceiver. In FIG. 6, verification transceiver 130 is affixed to product instance 132. Product instance 132 can be an instance of any of a wide variety of products. In the depicted embodiment, product instance 132 includes bottle 134 and metal cap 136 secured to bottle 134. Verification transceiver 130 includes Radio Frequency Identification (RFID) tag 138, RFID antenna 140, Radio Frequency Integrated Circuitry (RFIC) 142, and tamper element 144. Verification transceiver 130 is affixed to bottle 134 with metal cap 136 in a tamper-proof fashion. Verification transceiver 130 is affixed to bottle 134 such that RFID antenna 140 is placed away from the metal surface of metal cap 136. Such a configuration can ensure reliable performance of the RF communication conducted by verification transceiver 130. RFID tag 138 has an elongation portion 146 that contains tamper detection element 144 (e.g., a circuit/trace that indicates the tamper detection to RFIC 142) can be adhesively coupled to metal cap 136 and then sealed with shrink sleeve or a plastic lamination, for example. This sleeve/lamination can have a finger accessible peel-off area. After such a laminate/sleeve is peeled off, tamper element 144 is broken so as to indicate a tamper event to RFIC 142. Such an embodiment provides product-instance data communications as well as determining tampering of such a product instance.

Figure 7:
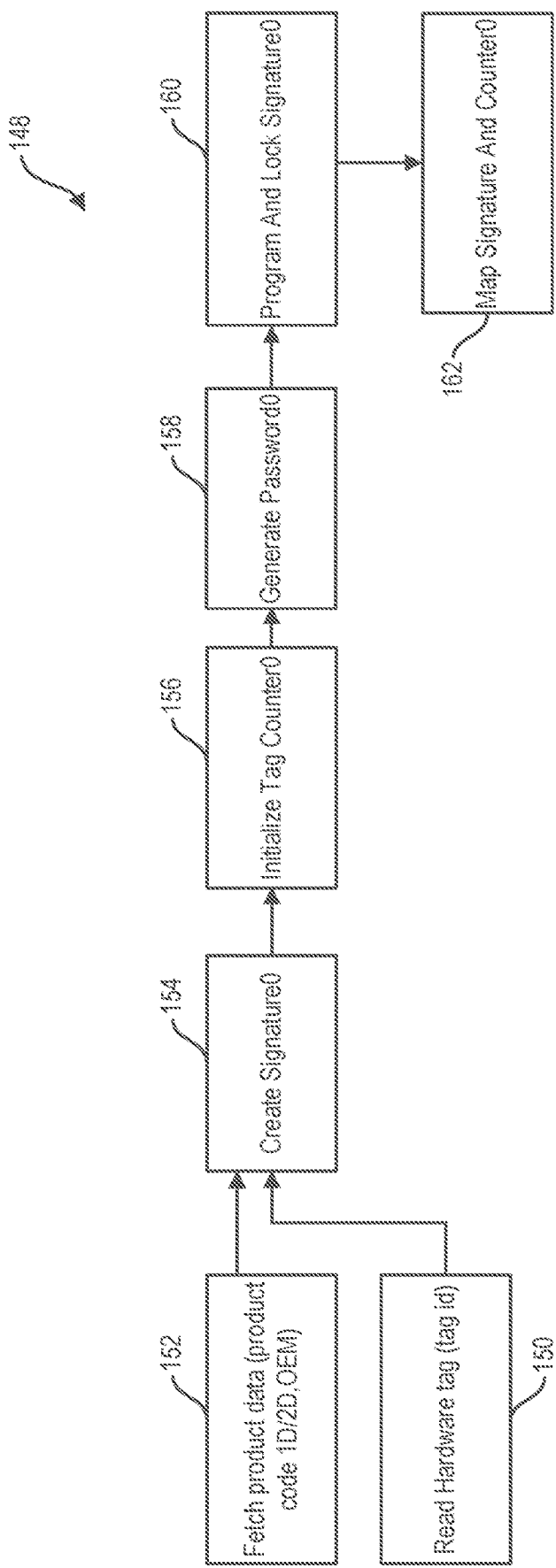
FIG. 7 is a schematic diagram of an embodiment of a method for creating a digital entity corresponding to a product instance.

FIG. 7 is a schematic diagram of an embodiment of a method for creating a digital entity corresponding to a product instance. In FIG. 7, method 148 for creating a digital entity will be described from the vantage point of IoT gateway 38 of factory-site product-data system 22 (as depicted in FIG. 1). IoT gateway 38 can be configured to create a unique, secure, and password-protected signature for each product instance based on the hardware tag information and the product data received from factory-site product-data system 22. The digital entity including data, such as the unique, secure, and password-protected signature, tag identification, and other product data is then uploaded to blockchain ledger located on the cloud.

Method 148 begins at block 150 where an RFID hardware tag is obtained. At block 152, product data associated with the product instance corresponding to the RFID hardware tag obtained is retrieved. Then, at block 154, the unique, secure, and password-protected signature is determined. Here, the product data and tag hardware are serialized to a stream of bytes. Such serialization can be configured to filter out a set of bytes to generate an irreversible signature based on a product code corresponding to the product instance. Then, at block 156, the tag counter is initialized. Then, at block 158, a password is associated with the product instance. Such a password can be determined, for example, by converting a product code and the hardware tag ID to a unique four-byte password. Such a conversion can be performed in a similar fashion to a color code format.

At block 160, the tag counter is programmed and locked along with the signature and stored in protected memory within the RFID tag. Then, at block 162, a digital entity (e.g., a digital record) is created with all the product attributes (including the signature and tag counter) and uploaded to the blockchain ledger. An off-chain database can be maintained to store product attributes, whose data size is more than 256 bytes—the byte limit of an exemplary block of a blockchain. A mapping can be maintained between the product attribute hash value and the raw data. The product attribute hash value will only be stored in the blockchain ledger, and not in the off-chain database.

Figure 8:
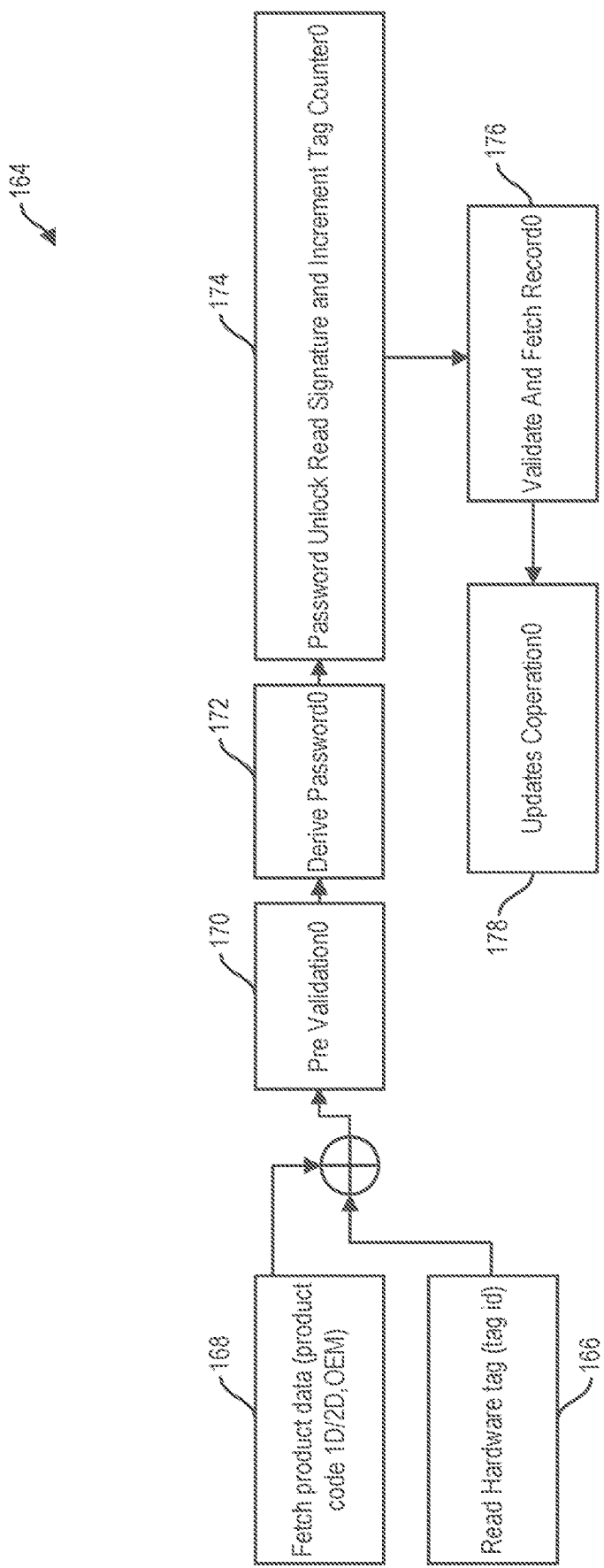
FIG. 8 is a schematic diagram of an embodiment of a method for verifying identity of a digital entity.

FIG. 8 is a schematic diagram of an embodiment of a method for verifying identity of a digital entity. In FIG. 8, method 164 for verifying identity of a digital entity from the vantage point of one of factory IoT gateway 38, economic operator app 48, and/or mobile app 32. Such entities can each be configured to verify the digital identity during the respective supply chain operations (such as dispatch from factory, check in to Economic operator premises, checkout from economic operator premises, product scan by consumer etc.).

Method 164 begins at block 166 where an RFID reader reads the RFID tag and obtains an RFID corresponding to the product instance. At block 168, product data corresponding to the product instance is retrieved from the RFID tag or from a product database indexed by the barcode, or by some other source. Then, at block 170, the entity validates the user requesting verification, so as to permit access to the supply-chain management functions/data. At block 172, a unique password corresponding to the user is provided to the entity so as to confirm authorization. At block 174, the tag-protected memory is unlocked in response to the acceptance of the unique password. After unlocking the tag-protected memory, the signature is read, the tag counter advanced, and then the tag protected memory is locked again. The tag counter is an encoded signal indicative of the product instance. The tag counter is advanced using a secret method known to the RFID tag and the database manager. At block 176, the product-authentication internet website is requested to verify authenticity based on the tag counter read. Then, at step 178, the product database is updated to reflect the verification of the product instance and of product transactions (e.g., sale of a product instance).

Figure 9:
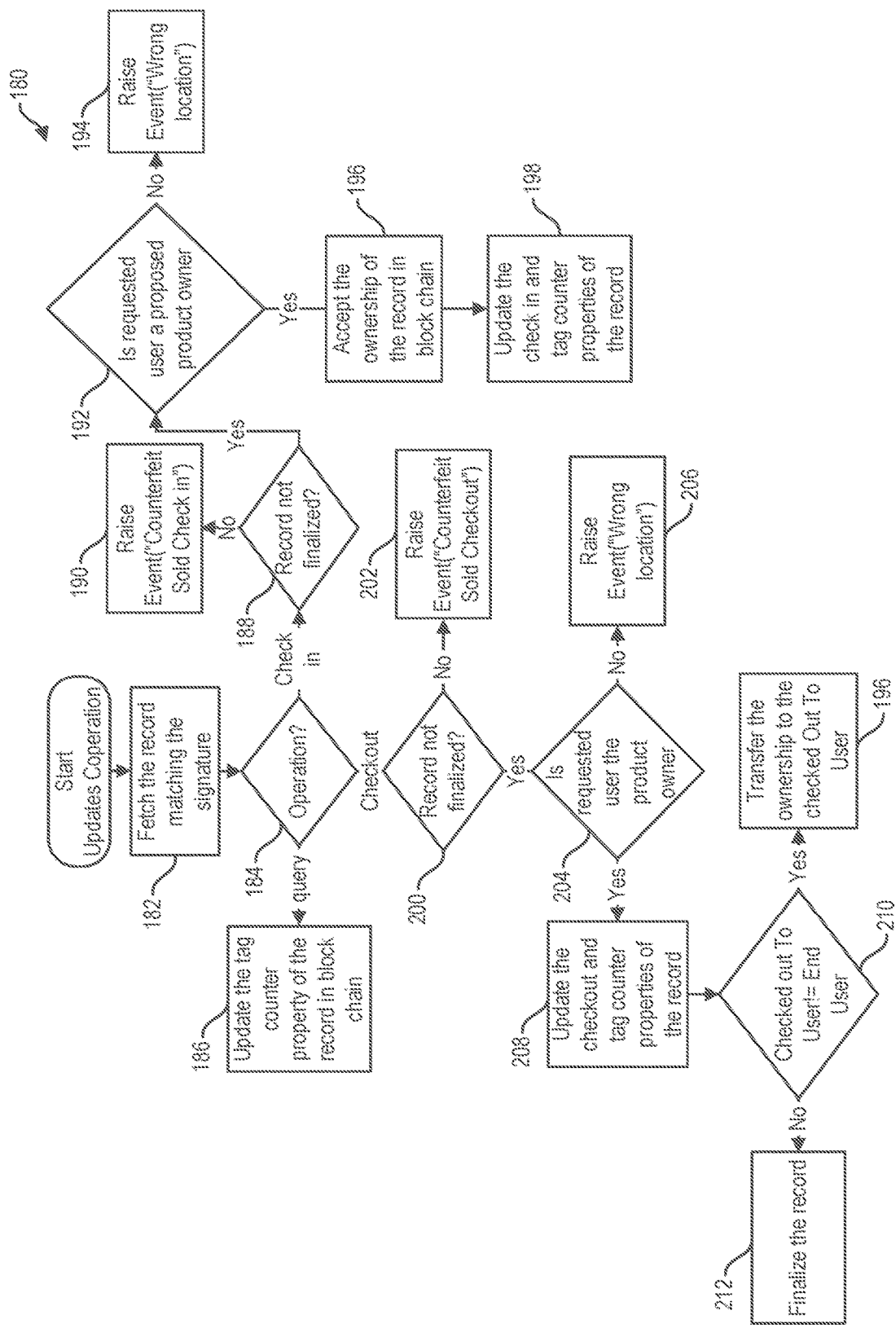
FIG. 9 is a flow chart of an embodiment of a method for supply chain management of product ownership.

FIG. 9 is a flow chart of an embodiment of a method for supply chain management of product ownership. In FIG. 9, method 180 for supply chain management of product ownership is depicted from the vantage point of the product database manager. Method 180 begins as step 182 where a product-instance record corresponding to an encoded signal indicative of a product instance is retrieved from a product database. At step 184, branching of the method occurs depending on what operation is requested by the entity. If, at step 184, verification of product authenticity is requested, method 180 advances to step 186, where the encoded signal indicative of a product instance (i.e., tag counter) is advanced and the product-instance record is updated to reflect the verification event. If, however, at step 184, the check-in of the product instance is requested, then method 180 advances to step 188, where verification of authenticity is determined. If, at step 188, authenticity is not determined, then method 180 advances to step 190, where a counterfeit sold check-in entry is added to the product-instance record.

If, however, at step 188, authenticity is determined, then method 180 advances to step 192, where geo-fencing is evaluated. If, at step 192, the location of the check-in event does not correspond to a predetermined geo location, then method 180 advances to step 194, where a wrong location entry is added to the product-instance record. If, however, at step 192, the location of the check-in event does correspond to a predetermined geo location, then method 180 advances to step 196, where ownership is updated to reflect the check-in event and a product-instance entry reflecting such an ownership change is added to the product-instance record.

If, back at step 184 the check-out of the product instance is requested, then method 180 advances to step 200, where verification of authenticity is determined. If, at step 200, authenticity is not determined, then method 180 advances to step 202, where a counterfeit sold check-out entry is added to the product-instance record.

If, however, at step 200, authenticity is determined, then method 180 advances to step 204, where geo-fencing is evaluated. If, at step 204, the location of the check-out event does not correspond to a predetermined geo location, then method 180 advances to step 206, where a wrong location entry is added to the product-instance record. If, however, at step 204, the location of the check-out event does correspond to a predetermined geo location, then method 180 advances to step 208, where the tag counter is advanced and a checkout event is added to the product-instance database. Then, at step 210, the entity obtaining ownership is determined whether to be an end user (e.g., a buying customer), or an intermediate owner. If, at step 210, the ownership is an end user, then method 180 advances to step 212, where the product-instance record is finalized to reflect such an event. If, however, at step 210, the ownership is determined to be some entity other than an end user, then method 180 advances to step 213, where ownership is updated to reflect the check-out event and a product-instance entry reflecting such an ownership change is added to the product-instance record.

Figure 10:
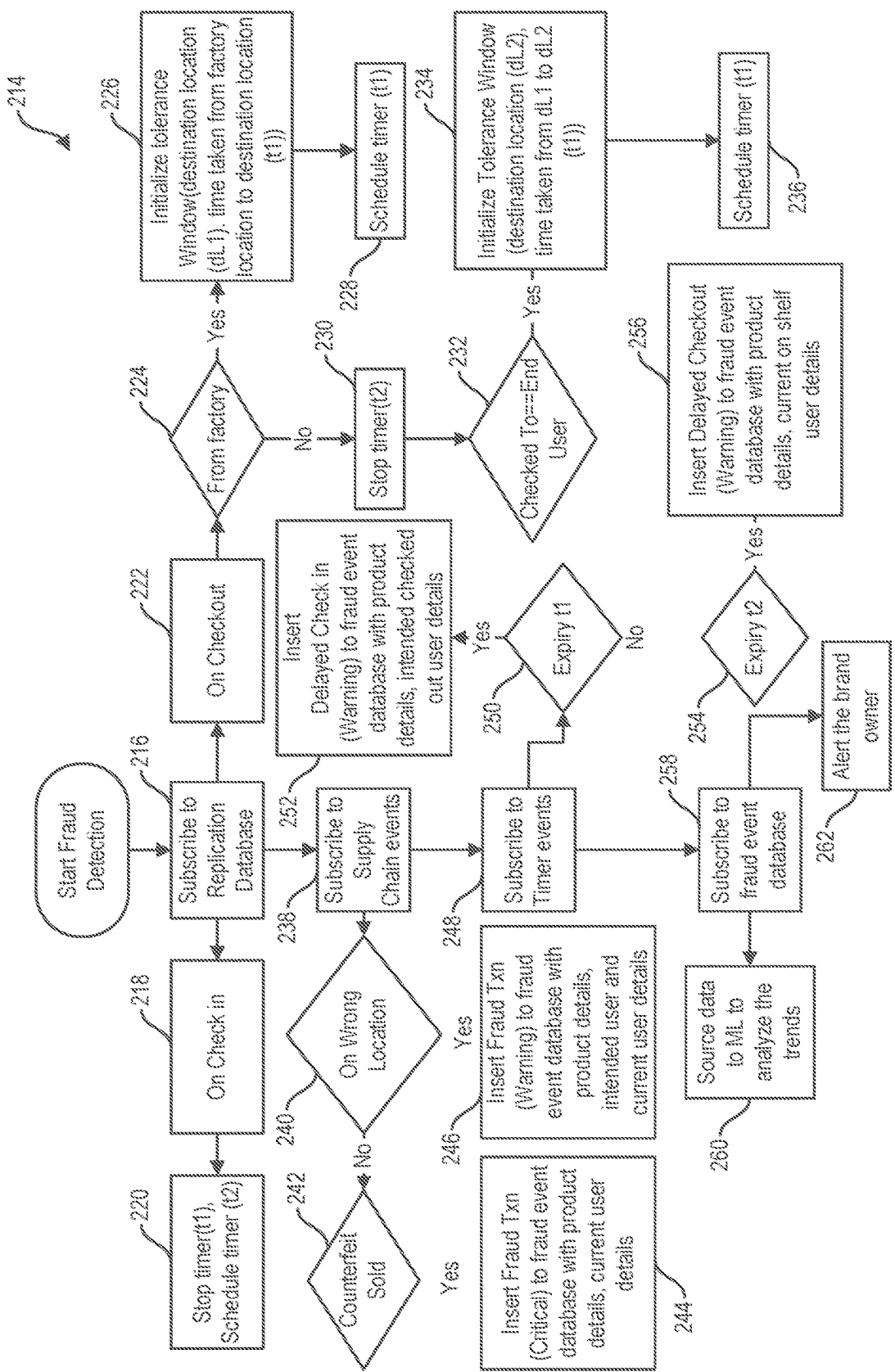
FIG. 10 is a flow chart of an embodiment of a method for detecting fraud.

FIG. 10 is a flow chart of an embodiment of a method for detecting fraud. In FIG. 10, method 214 for detecting fraud is depicted from the vantage point of the product database manager. Method 214 detects fraud by monitoring a variety of events indicative of fraud, such as, for example, improper time fenced events, improper geo-fenced events, improper tag sequence, etc.

Figure 11:
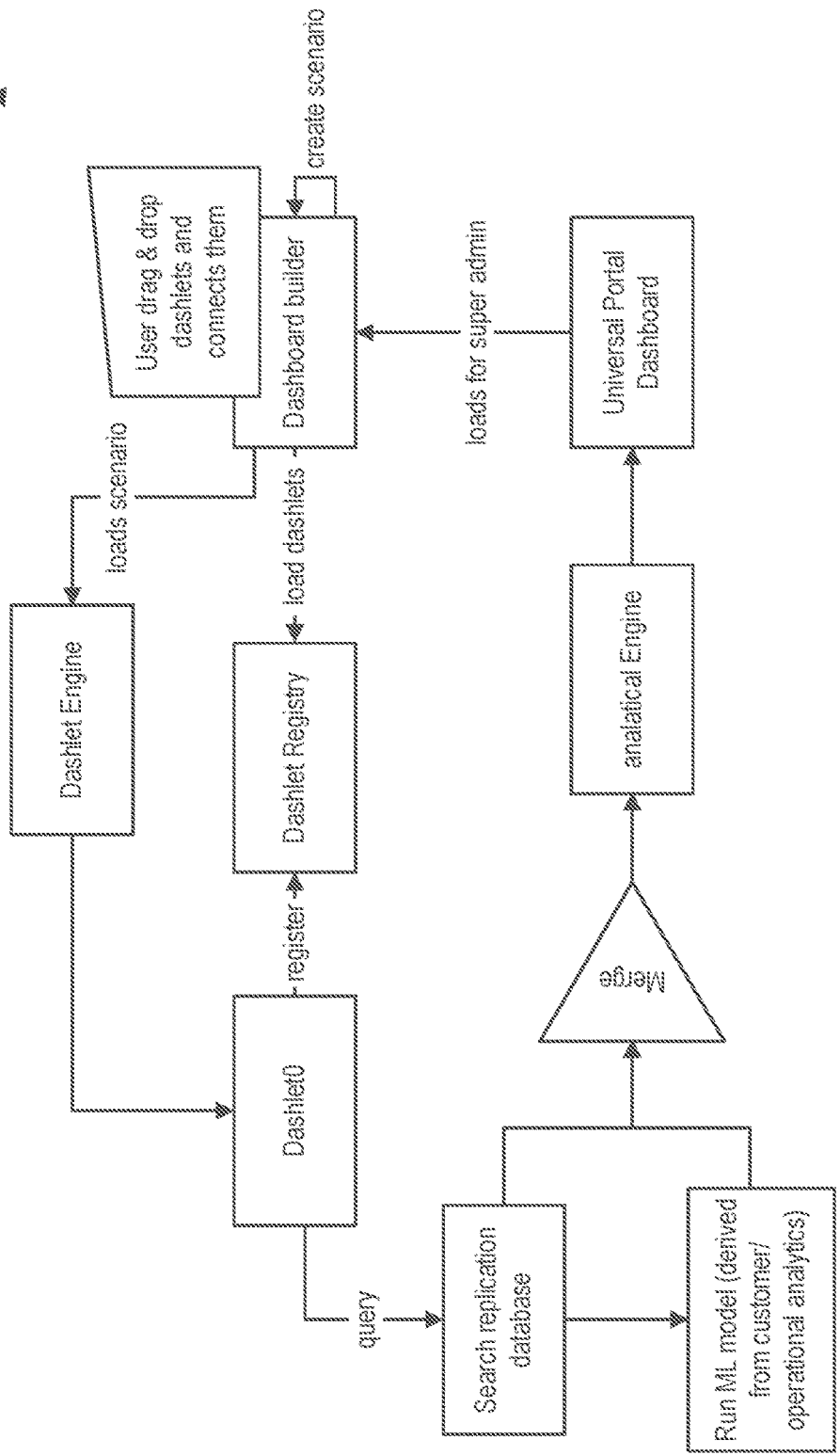
FIG. 11 is a flow chart of an embodiment of a method for building a dashboard.

FIG. 11 is a flow chart of an embodiment of a method for building a dashboard. The dashboard builder is one of the user interface of economic operator app 48 for a super-administrator role. Such a dashboard builder can be configured to build dynamic dashboards based on dashlets. Each dashlet can be a specialized function to output a single business insight or KPI (Key Performance Indicator) as a dataset. With the help of dashboard builder, each dashlet source is connected to another dashlet sink thereby enabling collaboration to deliver intelligent dashboards.

Discussion of Possible Embodiments

The following are non-exclusive descriptions of possible embodiments of the present invention.

Some embodiments relate to a method for providing verification of authenticity of a product instance. The method includes receiving, by product-authentication internet website, an authentication request signal that includes a current encoded signal indicative of the product instance from a remote mobile device proximate the product instance. The current encoded signal is a current one of a sequence of encoded signals. The method includes retrieving a current expected signal indicative of the product instance from a product database. The current expected signal is a current one of a sequence of expected signals. The current expected signal is a current one of a sequence of expected signals. The method includes determining authenticity of the produce instance based on a comparison of the current encoded signal retrieved and the encoded signal received. The method includes transmitting a verification signal indicative of the authenticity determined of the product instance. The method also includes adding the record to the block-chain database corresponding to the authentication request.

The method of the preceding paragraph can optionally include, additionally and/or alternatively, any one or more of the following features, configurations and/or additional components:

A further embodiment of the foregoing method, wherein the product database can include a plurality of product instance records corresponding to a plurality of product instances.

A further embodiment of any of the foregoing methods, wherein each of the plurality of product-instance records can include a plurality of entries, each corresponding to a product-instance event.

A further embodiment of any of the foregoing methods, wherein the product database can be a block-chain product database. Each of the entries of the product-instance entries can be linked via block-chain hash codes.

A further embodiment of any of the foregoing methods can further include receiving, by product-authentication internet website, one or more signals corresponding to one or more product-instance events. The method can also include creating, one or more product-instance records corresponding to the one or more signals corresponding to the one or more product-instance events.

A further embodiment of any of the foregoing methods, wherein the authentication request signal can include location data corresponding to a location of the mobile device at a time of query. The method can further include retrieving an expected location from the product database. The method can also include determining a comparison of the location data corresponding to a location of the mobile device at a time of query with the expected location retrieved. The verification signal can also be indicative of the comparison.

A further embodiment of any of the foregoing methods, wherein the authentication request signal can include date/ time data corresponding to date/time corresponding to a time of query. The method can further include retrieving an expiration date from the product database. The method can also include determining a comparison of the date/time data corresponding to date/time corresponding to a time of query with the expiration date retrieved. The verification signal can also be indicative of the comparison.

Some embodiments relate to a system for providing verification of authenticity of a product instance. The system includes a product-data management server and a computer readable memory. The product-data management server is in communication with a mobile device configured to query the product instance. The computer readable memory is encoded with instructions that, when executed by the product-data management server, cause the system to receive, by an internet website, an authentication request signal that includes an encoded signal indicative of the product instance from a remote mobile device proximate the product instance. The current encoded signal is a current one of a sequence of encoded signals. The computer readable memory is further encoded with instructions that, when executed by the product-data management server, cause the system to retrieve a current expected signal indicative of the product instance from a block-chain database. The current expected signal is a current one of a sequence of expected signals. The computer readable memory is further encoded with instructions that, when executed by the product-data management server, cause the system to determine authenticity of the produce instance based on a comparison of the current expected signal retrieved and the encoded signal received. The computer readable memory is further encoded with instructions that, when executed by the product-data management server, cause the system to transmit a verification signal indicative of the authenticity determined of the product instance. The computer readable memory is further encoded with instructions that, when executed by the product-data management server, cause the system to add the record to the block-chain database corresponding to the authentication request.

The system of the preceding paragraph can optionally include, additionally and/or alternatively, any one or more of the following features, configurations and/or additional components:

A further embodiment of the foregoing system, wherein the product database cab include a plurality of product instance records corresponding to a plurality of product instances.

A further embodiment of any of the foregoing systems, wherein each of the plurality of product-instance records can include a plurality of entries, each corresponding to a product-instance event.

A further embodiment of any of the foregoing systems, wherein the product database can be a block-chain product database. Each of the entries of the product-instance entries can be linked via block-chain hash codes.

A further embodiment of any of the foregoing systems, wherein the computer readable memory can be encoded with further instructions that, when executed by the product-data management server, cause the system to receive, by product-authentication internet website, one or more signals corresponding to one or more product-instance events. The computer readable memory can be encoded with further instructions that, when executed by the product-data management server, cause the system to create, one or more product-instance records corresponding to the one or more signals corresponding to the one or more product-instance events.

A further embodiment of any of the foregoing systems, wherein the authentication request signal can include location data corresponding to a location of the mobile device at a time of query. The computer readable memory can be further encoded with instructions that, when executed by the product-data management server, cause the system to retrieve an expected location from the product database. The computer readable memory can be further encoded with instructions that, when executed by the product-data management server, cause the system to determine a comparison of the location data corresponding to a location of the mobile device at a time of query with the expected location retrieved. The verification signal can also be indicative of the comparison.

A further embodiment of any of the foregoing systems, wherein the authentication request signal can include date/time data corresponding to date/time corresponding to a time of query. The computer readable memory can be further encoded with instructions that, when executed by the product-data management server, cause the system to retrieve an expiration date from the product database. The computer readable memory can be further encoded with instructions that, when executed by the product-data management server, cause the system to determine a comparison of the date/time data corresponding to date/time corresponding to a time of query with the expiration date retrieved. The verification signal can also be indicative of the comparison.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A method for verifying authenticity of a product instance, the method comprising:
   transmitting, by a mobile device, a query signal to a verification transceiver affixed to the product instance;
   transmitting, by the verification transceiver, a current encoded signal indicative of the product instance to the mobile device in response to receiving the query signal, wherein the current encoded signal is only valid one time for indicating the product instance;
   advancing, by the verification transceiver, the current encoded signal to a next encoded signal in a sequence of encoded signals, each indicative of the product instance, the current encoded signal advanced to be transmitted in response to a next received query signal, wherein the next encoded signal is based on the current encoded signal and generated using a hashing algorithm;
   transmitting, by the mobile device, an authentication request signal to a product-authentication internet website in response to receiving the current encoded signal, the authentication request signal including the current encoded signal;
   generating, by the internet website, an expected encoded signal based on a previous encoded signal and generated using the hashing algorithm used by the verification transceiver;

determining, by the internet website, authenticity or inauthenticity of the product instance based, at least in part, on a comparison between the current encoded signal and the expected encoded signal, wherein the authenticity or inauthenticity is determined without resort to querying the verification transceiver another time;

transmitting, by the internet website, a verification signal indicative of the authenticity or inauthenticity of the product instance as determined by the internet website; and indicating, by the mobile device, the authenticity or inauthenticity of the product instance as indicated by the verification signal.

2. The method of claim 1, further comprising:
rendering inoperative the verification transceiver upon opening of product packaging of the product instance.

3. The method of claim 1, wherein the sequence of encoded signals is limited to a finite number of encoded signals.

4. The method of claim 3, further comprising:
transmitting, by the verification transceiver, a signal indicative of excessive queries to the mobile device, if the advancing of the current encoded signal has exceeded a limit of the finite number of encoded signals.

5. The method of claim 3, wherein the finite number is limited to fewer than 10.

6. The method of claim 1, wherein transmitting the query signal to the verification transceiver is in response to an input provided by a user of the mobile device.

7. The method of claim 1, wherein transmitting the query signal to the verification transceiver is in response to proximity of the mobile device to the verification transceiver decreasing to less than a predetermined distance.

8. The method of claim 1, wherein transmitting the query signal to the verification transceiver comprises:
transmitting, via Near Field Communications (NFC), the query signal to the verification transceiver.

9. The method of claim 1, wherein transmitting the query signal to the verification transceiver comprises:
transmitting, via RFID protocols, the query signal to the verification transceiver.

10. The method of claim 1, wherein the authentication request signal includes location data corresponding to a location of the mobile device at a time of query.

11. The method of claim 10, wherein the authentication request signal includes date/time data corresponding to date/time corresponding to a time of query.

12. The method of claim 11, wherein the internet website determines the authenticity or inauthenticity further based on the location data and date/time data.

13. The method of claim 12, wherein the internet website determines the authenticity or inauthenticity further based on a comparison of the location data with an expected product location at a time indicated by the date/time data.

14. A system for verifying authenticity of a product instance, the system comprising:
a radio-frequency identification device (RFID) tag affixed to a product instance, the RFID tag comprising:
an engagement fixture configured to affix the RFID tag to a product instance;
a receiver configured to receive a query signal from a proximate mobile device;
a transmitter configured to transmit a current encoded signal indicative of the product instance in response to receiving the query signal, wherein the current encoded signal is only valid one time for indicating the product instance; and
radio-frequency integrated circuitry (RFIC) configured to advance the current encoded signal to a next encoded signal in a sequence of encoded signals, each of the sequence indicative of the product instance, current encoded signal advanced to be transmitted in response to a next received query signal, the current encoded signal advanced to be transmitted in response to a next received query signal, wherein the next encoded signal is based on the current encoded signal and generated using a hashing algorithm;
a mobile device executing an app configured to cause the mobile device to:
transmit the query signal to a RFID tag affixed to a product instance;
receive the current encoded signal indicative of the product;
transmitting an authentication request signal to a product-authentication internet website in response to receiving the current encoded signal, the authentication request signal including the current encoded signal;
receives a verification signal indicative of authenticity or inauthenticy of the product instance; and
indicates the authenticity or inauthenticity of the product instance as indicated by the verification signal; and
an internet website that:
generates an expected encoded signal based on a previous encoded signal and generated using the hashing algorithm used by the RFID tag;
determines the authenticity or inauthenticity of the product instance based, at least in part, on a comparison between the current encoded signal and the expected encoded signal, wherein the authenticity or inauthenticity is determined without resort to querying the verification transceiver another time; and
transmitting the verification signal indicative of the authenticity or inauthenticity of the product instance as determined.

15. The system of claim 14, wherein the RFID tag is rendered inoperative upon opening of product packaging of the product instance.

16. The system of claim 14, wherein the sequence of encoded signals is limited to a finite number of encoded signals.

17. The system of claim 16, wherein the RFID tag is further configured to transmit a signal indicative of excessive queries to the mobile device, if the advancing of the current encoded signal has exceeded a limit of the finite number of encoded signals.

18. The system of claim 17, wherein the finite number is limited to fewer than 10.

19. The system of claim 14, wherein transmitting the query signal to the RFID tag is in response to an input provided by a user of the mobile device.

20. The system of claim 14, wherein transmitting the query signal to the RFID tag is in response to proximity of the mobile device to the RFID tag decreasing to less than a predetermined distance.

21. The system of claim 14, wherein transmitting the query signal to the RFID tag comprises:
transmitting, via Near Field Communications (NFC), the query signal to the RFID tag.

22. The system of claim 14, wherein transmitting the query signal to the RFID tag comprises:

transmitting, via RFID protocols, the query signal to the RFID tag.

23. The system of claim 14, wherein the authentication request signal includes location data corresponding to a location of the mobile device at a time of query.

24. The system of claim 23, wherein the authentication request signal includes date/time data corresponding to date/time corresponding to a time of query.

25. The system of claim 24, wherein the internet website determines the authenticity or inauthenticity further based on the location data and date/time data.

26. The system of claim 25, wherein the internet website determines the authenticity or inauthenticity further based on a comparison of the location data with an expected product location at a time indicated by the date/time data.

* * * * *